United States Patent [19]

Blum et al.

[11] Patent Number: 6,165,557
[45] Date of Patent: Dec. 26, 2000

[54] SOLVENT-FREE COATING COMPOSITIONS WHICH CAN BE CURED WITH LOW EMISSIONS

[75] Inventors: Rainer Blum, Ludwigshafen; Uwe Meisenburg, Duisburg; Dietmar Chmielewski, Münster; Thomas Loerzer, Landau-Godramstein, all of Germany

[73] Assignee: BASF Coatings AG, Muenster-Hiltrup, Germany

[21] Appl. No.: 09/101,224

[22] PCT Filed: Dec. 13, 1996

[86] PCT No.: PCT/DE96/02406

§ 371 Date: Aug. 20, 1998

§ 102(e) Date: Aug. 20, 1998

[87] PCT Pub. No.: WO97/25386

PCT Pub. Date: Jul. 17, 1997

[30] Foreign Application Priority Data

Jan. 4, 1996 [DE] Germany .......................... 196 00 137

[51] Int. Cl.$^7$ .................................. B05D 3/02; B05D 7/16
[52] U.S. Cl. ...................................... 427/385.5; 427/388.1
[58] Field of Search ................................ 427/385.5, 388.1

[56] References Cited

U.S. PATENT DOCUMENTS

| | | |
|---|---|---|
| 3,312,644 | 4/1967 | Miyairi et al. . |
| 4,100,120 | 7/1978 | Mackawa et al. . |
| 4,224,430 | 9/1980 | Maekawa et al. ...................... 526/282 |
| 4,311,624 | 1/1982 | Emmons et al. . |
| 4,546,129 | 10/1985 | Hefner, Jr. . |

FOREIGN PATENT DOCUMENTS

| | | |
|---|---|---|
| 0 088 510 A2 | 1/1983 | European Pat. Off. . |
| 261056 | 10/1988 | German Dem. Rep. . |
| 1570273 | 6/1965 | Germany . |
| 1 770 273 | 4/1968 | Germany . |
| 27 08 846 | 3/1977 | Germany . |
| 31 07 450 | 2/1981 | Germany . |
| 01 01 585 A2 | 8/1983 | Germany . |
| 3508207 | 9/1986 | Germany . |
| 6-329773 | 11/1994 | Japan . |

OTHER PUBLICATIONS

WPI/Derwent, accession No. 80–21087C, Hitachi Chem Co Ltd: Low viscosity, high solids coating composition contains hydroxyl–containing polyester resin obtd. From di:cyclopentadiene–maleic acid adduct and di:isobutenyl succinic acid (anhydride), JP 55–018431 A, Feb. 1980.

*Primary Examiner*—Erma Cameron

[57] ABSTRACT

The invention relates to solvent-free coating compositions which can be cured with low emissions and comprise, as binders, saturated and/or unsaturated polyesters whose structural units include dihydrodicyclopentadiene units of the formula (I):

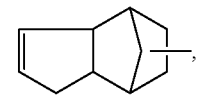

(I)

and/or oligodihydrodicyclopentadiene units of the formula (II):

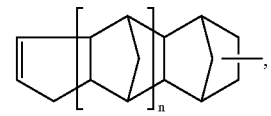

(II)

where n=1 to 10,
to processes for the production of coatings using the novel coating compositions, and to the use of the coating compositions for coating metal containers, especially cans.

19 Claims, No Drawings

SOLVENT-FREE COATING COMPOSITIONS WHICH CAN BE CURED WITH LOW EMISSIONS

BACKGROUND OF THE INVENTION

The invention relates to solvent-free coating compositions which can be cured with low emissions, and especially printing inks, which comprise, as binders, monomer-free saturated and/or unsaturated polyester resins containing dihydrodicyclopentadiene and/or oligodihydrodicyclopentadiene structural units, and to their use, in particular, for metal containers, for example cans.

Unsaturated polyester resins having dicyclopentadiene structural units as constituents of customary UP resin systems are known. In general, such UP resin systems contain a monomeric reactive diluent such as, in particular, styrene, which give rise to emission problems in the course of processing of the UP resins.

Also known are printing inks, especially for metal containers, consisting of binder, solvents, pigments and auxiliaries. Examples of known binder systems are alkyd resins, which are crosslinked with melamine- or urea-formaldehyde resins and which are employed in printing inks or printing materials with typical solvent contents of up to 50%.

Known alternatives to the solvent-containing systems are, as relatively low-emission systems, powder coatings, aqueous coating systems and liquid, (UV-)radiation-curable coating materials.

Powder coatings have the disadvantage that the requirements for good storage stability, especially for blocking resistance, and for good flow on melting of the powder coating are often at odds with one another.

Disadvantageous features of the aqueous systems are that the evaporation of the water is expensive, especially energy-intensive, and that the water usually has a damaging effect on the substrates to be coated.

The liquid, (UV-)radiation-curing systems, in which in general all of the components of the coating material remain in the resulting coating, do indeed have good leveling and good coating properties, but on the other hand the toxic potential of the reactive diluents and/or of the photoinitiators employed, and the inhibition of curing on the coating surface by means of atmospheric oxygen, are often of great disadvantage.

DE-A-27 08 846 describes the partial replacement of the reactive diluent styrene in the customary UP resin systems by specific polyesters having dicyclopentadiene structural units, and the use of such UP resin systems as materials. The residue of the reactive diluent, styrene, which remains is objectionable for the application of such resin systems, in particular, as printing inks which can be cured and processed with low emissions, on ecological grounds and on the grounds of pollutant contamination at the workplace.

DE-A-31 07 450 comprises unsaturated polyesters with dicyclopentadiene oligomers as end groups, which are used as solutions in ethylenically unsaturated monomers in order to produce moldings and coatings. The ethylenically unsaturated monomers employed as reactive diluents are generally problematic as a result of their high vapor pressure at room temperature and processing temperature and of the emission problems associated with this.

EP-A-0 101 585 describes unsaturated polyester resins which are modified by the addition of cyclopentadiene onto the double bonds of the unsaturated units of the polyester and are then dissolved in vinyl monomers as reactive diluent.

Again, the use of vinyl monomers as reactive diluent causes problems from the ecological and toxicological standpoint.

SUMMARY OF THE INVENTION

The prior art resulted, therefore, in the problem of providing binders for coating compositions, especially printing inks, especially for metal containers, which on the one hand can be cured fully and applied well and on the other hand are largely free from solvents and/or reactive diluents. Moreover, such binders should possess the properties required of printing-ink binders, such as, for example, good capacity for accommodating pigments and/or dies, storage stability, adequate processing times and good processability.

It has surprisingly been found that coating compositions free from solvent and largely free from reactive diluent, which cure with low emissions, can be provided if the binders employed are saturated and/or unsaturated polyester resins whose structural units include dihydrodicyclopentadienyl units of the formula (I) and/or oligodihydrodicyclopentadienyl units of the formula (II):

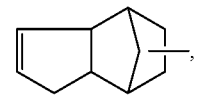
(I)

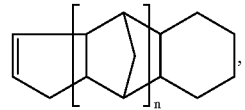
(II)

where n=1 to 10.

The dihydrodicyclopentadienyl units and/or the oligodihydrodicyclopentadienyl units are preferably esters of dihydrodicyclopentadienol in accordance with formula (III) or esters of oligodihydrodicyclopentadienol in accordance with formula (IV):

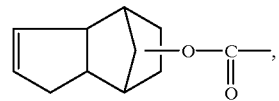
(III)

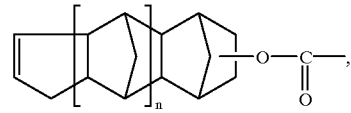
(IV)

where n=1 to 10.

Particularly preferred dihydrodicyclopentadiene units and/or oligodihydrodicyclopentadiene units are monoesters of dihydrodicyclopentadienol with maleic acid and/or fumaric acid in accordance with formula (V) or monoesters of oligodihydrodicyclopentadienol with maleic acid and/or fumaric acid in accordance with formula (VI):

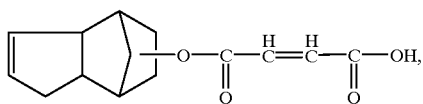
(V)

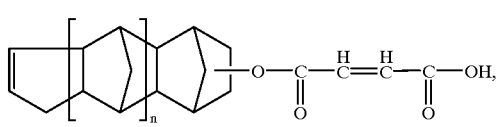
(VI)

where n=1 to 10.

It is additionally preferred for the saturated and/or unsaturated polyester resins to contain mono- and/or polyols which are alkoxylated, preferably ethoxylated and/or propoxylated, being derived for example from polyethylene oxide, polypropylene oxide or polytetrahydrofuran, as structural units.

In a preferred embodiment of the invention the saturated and/or unsaturated polyester resins contain mono- and/or polyols containing polyester units, for example polycaprolactone, as structural units.

The unsaturated polyester resins preferably contain ethylenically unsaturated polymer structural units, such as, preferably, maleic acid and/or fumaric acid.

The saturated and/or unsaturated polyester resins preferably contain mono- and/or polyols containing imide groups, as structural elements.

Also preferably, the saturated and/or unsaturated polyester resins contain mono- and/or polycarboxylic acids, containing imide groups, as structural units.

In another preferred embodiment of the invention the binders contain up to 100% by weight, based on the binder, of low molecular mass esterification products having the (oligo)dihydrodicyclopentadiene structural units of the formulae (III) and/or (IV) and/or monoesters of the formulae (V) and/or (VI), the esterification products having a low viscosity and a high boiling point.

Also covered by the present invention are processes for the production of coatings, especially on metal containers, where the above-described coating compositions are cured by purely thermal means at temperatures between 80 and 300 degrees.

There are also processes for the production of coatings with the above-described coating compositions, in which curing is carried out with the aid of free-radical initiators at room temperature or elevated temperature, if appropriate in a number of stages.

Preference is also given to processes for the production of coatings with the above-described coating compositions, in which the coating compositions possess processing viscosity at room temperature or are brought to processing viscosity by heating to temperatures <130 degrees C., preferably <90 degrees C., particularly preferably <40 degrees C.

Likewise covered by the invention is the use of the novel coating compositions for the varnishing, coating and printing, in particular, of metal containers, for example cans made of metal, especially of aluminum, steel plate or tinplate. In this context the novel coating compositions can be printed, for example, in dry offset or in wet offset and can be baked without lubricating wax and with or without a topcoat.

DETAILED DESCRIPTION OF THE INVENTION

The Binder Components of the Coating Compositions

The dihydrodicyclopentadienyl structural units and oligodihydrodicyclopentadienyl structural units of the formulae (I) to (VI) are all derived from the starting material dicyclopentadiene, which in turn is a dimerization product of cyclopentadiene (for the synthesis of cyclopentadiene see, for example, Ullmanns Enzyklopädie der technischen Chemie [Ullmann's Encyclopaedia of Industrial Chemistry], 4th Ed., Volume 9, pages 699 to 704, Verlag Chemie, Weinheim, 1975).

Cyclopentadiene dimerizes spontaneously at room temperature to form dicyclopentadiene. At temperatures above 100 degrees C., preferably at temperatures between 170 and 300 degrees C. and under pressure, cyclopentadiene reacts with itself, via dicyclopentadiene as intermediate, to form oligodicyclopentadiene, by the mechanism of the Diels-Alder reaction. On addition of catalysts, for example the halides of aluminum, antimony, boron, iron, bismuth or tin, cyclopentadiene polymerizes in the absence of oxygen to form polycyclopentadiene with molecular weights ranging up to more than 10,000 daltons.

The dihydrodicyclopentadiene and/or oligodihydrodicyclopentadiene units present in the novel coating compositions can be traced back to the corresponding dihydrodicyclopentadienol of the formula (VII):

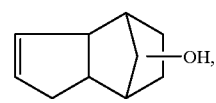
(VII)

or to the corresponding oligodihydrodicyclopentadienol of the formula (VIII):

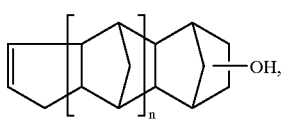
(VIII)

where n=1 to 10.

The compounds of the formulae (VII) and (VIII) are obtainable, for example, from dicyclopentadiene and, respectively, oligodicyclopentadiene by the addition of water, catalyzed by acid if appropriate, and are available commercially.

In the context of the preparation of the novel binders, the (oligo)dihydrodicyclopentadienols of the formulae (VII) and (VII) [sic], even taken individually, can be employed as synthesis building block.

The structural units of the formulae (III) and (IV) are preferably obtainable by reacting the dicyclopentadiene and/or the oligodicyclopentadiene with acids, preferably with carboxylic acids, particularly preferably with polycarboxylic acids. With very particular preference, the acid employed is maleic acid and/or fumaric acid in quantities such that the corresponding monoesters of the formulae (V) and (VI) are obtained as structural units. In order to prepare the synthesis building blocks in accordance with formulae (III) to (VI), the dicyclopentadiene and/or the oligodicyclopentadiene is/are preferably reacted with the (poly)carboxylic acid in the presence of water at preferably elevated temperature.

It is of course also possible to obtain the structural units (III) to (VI), containing ester groups, by reacting the corresponding dihydrodicyclopentadienol (VII) and/or the corresponding oligodihydrodicyclopentadienol (VIII) with acids, preferably with carboxylic acid, particularly preferably with polycarboxylic acids and, with very particular preference, with maleic acid and/or fumaric acid.

Examples of suitable polycarboxylic acids which in addition to the novel structural units may also participate as sole structural unit in the structure of the unsaturated and/or saturated polyesters are, in addition to the maleic acid and/or fumaric acid preferably employed: phthalic acid, isophthalic acid, terephthalic acid, tetrahydro- and/or hexahydrophthalic acid, endomethylenetetrahydrophthalic acid, malonic acid, succinic acid, glutaric acid, sebacic acid, azelaic acid, trimellitic acid, pyromellitic acid, di- and/or polycarboxylic acids containing ethylenically unsaturated structural units, for example itaconic acid, aconite acid, mono- or polyunsaturated fatty acids, for example the fatty acids of coconut oil, groundnut oil, castor oil, tung oil, soybean oil, linseed oil, cottonseed oil or safflower oil, and/or the anhydrides of the polycarboxylic acids mentioned, provided they can be synthesized.

The dihydrodicyclopentadiene and/or oligodihydrocyclopentadiene structural units of the formulae (I) and (II) are preferably introduced into the novel saturated and/or unsaturated polyesters by the partial use of the ester derivatives of the (oligo)dihydrodicyclopentadiene structural units of the formulae (V) and (VI).

The novel saturated and unsaturated polyesters are synthesized in accordance with the known techniques of the prior art, generally by polycondensation of di- and polyols and/or of di- and/or polycarboxylic acids and/or their anhydrides at elevated temperature. It may additionally be advantageous, instead of the di- and/or polycarboxylic acids, to employ esters thereof with lower alcohols and to prepare the polyesters by transesterification at elevated temperatures, since transesterifications of this kind in some cases take place faster than the comparable esterification reaction.

By the (partial) use of di- and/or polyfunctional amines, for example ethylenediamine, propylene-1,2-diamine and -1,3-diamine, hexamethylenediamine, phenylenediamine or melamine, it is also possible to obtain polyesters having amide groups.

In order to regulate the molecular weight of the novel polyesters it is possible to employ monofunctional compounds, such as alcohols, examples being butanol, hexanol or else (oligo)dihydrodicyclopentadienol, monofunctional amines, examples being propyl amine or aniline, and also monofunctional carboxylic acids, examples being acetic acid or benzoic acid.

The introduction of amide structures or else imide structures into the novel binder resins is known, for example, from DE-A-15 70 273 and DE-A-17 20 323. Such polyesteramides or polyesterimides may meet certain requirements, for example increased thermal stability, in some cases better than polyesters containing exclusively polyol units and polycarboxylic acid units.

Di- and/or polyols suitable for the synthesis of the novel polyesters are, for example: ethylene glycol, propane-1,2- and -1,3-diol, butane-1,2-, -1,3- and -1,4-diol, 2-ethylpropane-1,3-diol, 2-ethylhexane-1,6-diol, 1,3-neopentylglycol, 2,2-dimethylpentane-1,3-diol, hexane-1,6-diol, cyclohexane-1,2- and -1,4-diol, 1,2- and 1,4-bis-(hydroxymethyl)cyclohexane, bis(ethylene glycol) adipate, ether alcohols, such as di- and triethylene glycol or dipropylene glycol, bisphenols, perhydrogenated bisphenols, butane-1,2,4-triol, hexane-1,2,6-triol, trimethylolethane, trimethylolpropane, trimethylolhexane, glycerol, pentaerythritol, dipentaerythritol, mannitol and sorbitol.

As di- and/or polyol structural units it is additionally possible to employ oligomeric and/or polymeric di- and/or polyols, examples being: hydroxyl-modified polybutadienes, hydroxyl-containing polyurethanes or hydroxyl-containing epoxy resins. Also of particular importance are alkoxylated di- and/or polyols, such as, for example, the ethoxylation or propoxylation products of the di- and/or polyols mentioned.

In a further embodiment of the invention, the novel binders are prepared as follows:

In a first stage a polyester resin, polyesteramide resin or polyesterimide resin (prepolyester) is synthesized which has no structural units of the formula (I) and of the formula (II) but instead contains an excess of free acid groups as a result of a specific ratio of hydroxyl groups to acid groups during the polyester synthesis.

In the following stage, the prepolyester is reacted with dicyclopentadiene, in the presence or absence of catalysts, by a polymer-analogous reaction to give the polyesters with the structural units of the formulae (I) and/or (II). In the case of unsaturated prepolyesters containing ethylenically unsaturated double bonds, a secondary reaction which occurs is the addition of cyclopentadiene onto the double bonds, which, in the case of maleic acid units, for example, leads to the formation of endomethylenetetra-hydrophthalic acid structural units.

The synthesis of novel polyesters which meet specific requirements, for example relating to hardness, elasticity or processing viscosity, is carried out in accordance with rules known to the person skilled in the art. Thus it is possible, for example, to vary the elasticity of the polyesters by means of the chain length of the polyols and/or polycarboxylic acids incorporated between the ester linkage points: for example, polyesters containing hexanediol and/or adipic acid structural units are more elastic than polyesters containing ethylene glycol and/or phthalic acid structural units.

The person skilled in the art is also aware that by the incorporation of tri- or polyfunctional polyols and/or polycarboxylic acids, and the introduction, associated therewith, of branching points in the polyester molecule, it is possible to influence critically the properties of the polyester resins, especially their viscosity.

In general the (oligo)dihydrodicyclopentadiene compounds of the formulae (V) to (VIII) are, owing to their monofunctional nature with respect to the polycondensation reaction, terminal groups in the polyester molecule, and therefore reduce the reactivity of the growing polyester molecules in the course of the synthesis of high molecular mass polyesters. An increase in the reactivity of the growing polyester molecules, for example by using polyols, leads to polyesters of inappropriately high viscosity.

In another embodiment of the invention, the binders contain up to 100% by weight, based on the binder, of low molecular mass esterification products containing (oligo) dihydrodicyclopentadiene structural units of the formulae (III) and/or (IV) and/or monoesters of the formulae (V) and/or (VI), the esterification products having a low viscosity and a high boiling point.

The low molecular mass esterification products can be prepared, for example, by reacting the (oligo) dihydrodicyclopentadiene compounds of the formulae (V) and/or (VI) with monofunctional and/or polyfunctional alcohols.

In this case it is possible as monofunctional alcohols (monools) to use, for example, butanol, hexanol, polyethylene glycol monoalkyl ethers or polypropylene glycol monoalkyl ethers.

Examples of polyfunctional alcohols (polyols) are the polyols already mentioned above in the context of the polyester synthesis, especially butanediol, hexanediol, trimethylolpropane, pentaerythritol or compounds of even higher hydroxy functionality.

Other polyol components of particular importance are the alkoxylation products, especially the ethoxylation products and/or the propoxylation products, of such polyols, and also polyester polyols, for example polycaprolactone, or polyether polyols, based for example on polyethylene oxide, polypropylene oxide or polytetrahydrofuran, whose esterification with the (oligo)dihydrodicyclopentadiene compounds of the formulae (V) and (VI) leads to esters of low viscosity. By way of the nature of the alkoxylating agents and the degree of alkoxylation it is also possible to control properties of the resulting cured films, for example hardness, abrasion resistance, flexibility and lubricity.

The polyols may also be esterified exclusively with the (oligo)dihydrocyclopentadiene compounds of the formulae (V) and (VI), in which case the residually [sic] hydroxyl groups of the polyols remain free or are esterified, etherified or reacted with other substances which are reactive with hydroxyl groups, such as, for example, isocyanates or epoxides.

Furthermore, the low molecular weight esterification products can be prepared, for example, by reacting the (oligo)dihydrocyclopentadienol of the formula (VII) or (VIII) with monocarboxylic or polycarboxylic acids. Examples of monocarboxylic acids which may be mentioned are: acetic acid, propionic acid, hexanoic acid, benzoic acid and also preferably monofunctional, monounsaturated or polyunsaturated fatty acids, as indicated above, or other monounsaturated and polyunsaturated monofunctional carboxylic acids or their esters and/or their anhydrides.

Polycarboxylic acids suitable for the esterification are, for example: phthalic acid, isophthalic acid, terephthalic acid, tetrahydro- and/or hexahydrophthalic acid, endomethylenetetrahydrophthalic acid, malonic acid, succinic acid, glutaric acid, sebacic acid, azelaic acid, trimellitic acid, pyromellitic acid, and also preferably dicarboxylic and/or polycarboxylic acids having ethylenically unsaturated double bonds, such as itaconic acid, aconitic acid, mono- and polyunsaturated compounds having at least two carboxyl groups and, with particular preference, maleic acid and/or fumaric acid, and also the esters and anhydrides of the compounds mentioned.

The low molecular mass esterification products can be employed alone as novel binder or in a mixture with polyesters, which preferably contain (oligo) dihydrodicyclopentadiene structural units and which are in general of high melt viscosity.

In a mixture with high molecular mass polyesters, the low molecular mass esterification products bring about a reduction in the processing viscosity and function simultaneously as additionally highly active crosslinking agents. Compared with the customary reactive diluents, the low molecular mass esterification products have the advantage of a high boiling point and therefore of a low volatility coupled at the same time with high crosslinking efficiency.

Preparation and Use of the Novel Coating Compositions

An important feature of the present invention is the establishment of the temperature-dependent viscosity of the coating compositions, especially of the printing inks, which is achieved by the specific selection of the binders mentioned. Owing to the low viscosity and the high crosslinking reactivity of the (oligo)dihydrodicyclopentadiene structural units of the binders, coating compositions, especially printing inks, are made available which can be processed without problems and largely without the customary reactive diluents, for example styrene, vinyltoluenes, alphamethylstyrene, allyl esters or (meth)acrylates, either even at room temperature or at slightly elevated temperatures. Suitable components for establishing the processing viscosity are, in particular, the low molecular mass esterification products of mono- and/or polyols with (oligo) dihydrodicycloentadiene [sic] structural units of the formulae (III) to (VI) or of mono- and/or polycarboxylic acids with (oligo)dihydrodicyclopentadienols of the formulae (VII) or (VIII).

The novel binders are preferably prepared first of all, it being possible for the binders to consist of saturated and/or unsaturated polyesters having (oligo) dihydrodicyclopentadiene structural units, of the low molecular mass esterification products having (oligo)dihydrodicyclopentadiene structural units, of mixtures of saturated and/or unsaturated polyesters having (oligo)dihydrodicyclopentadiene structural units and low molecular mass esterification products having (oligo)dihydrodicyclopentadiene structural units and also of mixtures of saturated and/or unsaturated polyesters without (oligo)dihydrodicyclopentadiene structural units and low molecular mass esterification products with (oligo)dihydrodicyclopentadiene structural units.

In the context of the preparation of the novel polyesters having (oligo)dihydrodicyclopentadiene structural units it is possible to prepare the low molecular mass esterification products having (oligo)dihydrodicyclopentadiene structural units in situ by specific selection of the stoichiometric ratios of the reactants.

The novel coating compositions, especially printing inks, are produced by subsequent formulation of the binders with catalysts, fillers, pigments which are known per se, and also other additives and/or auxiliaries.

Customary color-imparting pigments and/or fillers are, for example, inorganic substances, such as titanium dioxides, iron oxides, silicon dioxides, aluminum silicate, lead compounds and chromate compounds, barium sulfate, mica, talc, kaolin or chalk, and also organic substances, such as carbon blacks, azo die pigments or phthalocyanine die pigments. Examples of auxiliaries and additives are: leveling agents, such as silicone oils, plasticizers, such as phosphates or phthalates with long-chain alkyl substituents, matting agents, UV absorbers or light stabilizers.

It is also possible for the ethylenically unsaturated reactive diluents known per [lacuna] to be present in minor quantities, not more than up to 20% by weight, based on the coating composition, so that it is possible to prepare low-emission printing inks containing reactive diluent which meet the statutory emission regulations.

The novel coating compositions can be cured by baking at customary temperatures. Accelerated curing or lower curing temperatures can be achieved by the addition of free-radical initiators.

Examples of free-radical initiators which can be employed are: peroxides, thermally unstable and highly substituted etane [sic] derivatives, based for example on silyl-substituted ethane derivatives and based on benzopinacol. It is also possible to employ azo compounds or azides.

A considerable acceleration of curing or reduction in curing temperature can be achieved by means of metal coinitiators, such as compounds of cobalt, of iron, of manganese, of nickel or of lead.

The novel coating compositions are employed in particular as printing inks in the decorative and protective printing of, especially metal containers and closures of all kinds, specifically in the case of two-piece and three-piece cans. A particular feature of the novel coating compositions is their good adhesion both to metal substrates and to substrates which have already been coated with the novel coating composition, i.e. for example in the case of multiple printing of cans. It is possible without problems to deform the metal substrates in the partially or ready-coated state within the production process without any cracking or delamination of the coating.

The novel coating compositions can be adjusted in their viscosity and in their reactivity such that they can be processed using the customary coating apparatus of the prior art.

In the text below the invention will be illustrated in more detail with reference to working examples, but the invention is not intended to be limited to these examples. Parts are parts by weight unless stated otherwise.

EXAMPLES

Example 1

Preparation of the Binder BM1

1586.5 g of dicyclopentadiene and 1176.7 g of maleic anhydride are weighed into a flask incorporating heating and reflux condenser. The mixture is heated to 125 degrees C. under a gentle stream of nitrogen (to render it inert). Subsequently, 226.0 g of water are added from a dropping funnel over the course of one hour, after which the mixture is left to after-react at 125 degrees C. for one hour more. This gives the monocarboxylic acid of formula (V). The contents of the flask are cooled to 70 degrees C. and then 715.0 g of 1,6-hexanediol, 4.0 g of dibutyltin dilaurate and 0.5 g of hydroquinone are added. The mixture is heated rapidly to 120 degrees C. under a gentle stream of nitrogen and then the reaction temperature is gradually raised to 190 degrees C. over the course of 6 hours, during which the water of condensation produced is removed by distillation.

This gives a soft binder resin BM1 having an acid number of 24 mg of KOH/g and the following temperature-dependent viscosities:

| Viscosity [mPas] | Temperature [degrees C.] |
|---|---|
| 4650 | 50 |
| 1460 | 75 |
| 260 | 100. |

Example 2

Preparation of the Binder BM2

661.1 g of dicyclopentadiene and 490.3 g of maleic anhydride are weighed into a flask incorporating heating and reflux condenser. The mixture is heated to 125 degrees C. under a gentle stream of nitrogen (to render it inert). Subsequently, 95.0 g of water are added from a dropping funnel over the course of one hour, after which the mixture is left to after-react at 125 degrees C. for one hour more. This gives the monocarboxylic acid of formula (V). The contents of the flask are cooled to 70 degrees C. and then 214.2 g of maleic anhydride, 557.2 g of 1,6-hexanediol, 4.0 g of dibutyltin dilaurate and 0.5 g of hydroquinone are added. The mixture is heated rapidly to 120 degrees C. under a gentle stream of nitrogen and then the reaction temperature is gradually raised to 190 degrees C. over the course of 6 hours, during which the water of condensation produced is removed by distillation.

This gives a highly viscous binder resin BM2 having an acid number of 18 mg of KOH/g and the following temperature-dependent viscosities:

| Viscosity [mPas] | Temperature [degrees C.] |
|---|---|
| 7148 | 50 |
| 2660 | 75 |
| 395 | 100. |

Example 3

Preparation of the Binder BM3

661.1 g of dicyclopentadiene and 490.3 g of maleic anhydride are weighed into a flask incorporating heating and reflux condenser. The mixture is heated to 125 degrees C. under a gentle stream of nitrogen (to render it inert). Subsequently, 95.0 g of water are added from a dropping funnel over the course of one hour, after which the mixture is left to after-react at 125 degrees C. for one hour more. This gives the monocarboxylic acid of formula (V). The contents of the flask are cooled to 70 degrees C. and then 1859.0 g of an ethoxylation product of one mole of trimethylolpropane and 20 mol of ethylene oxide, 3.0 g of dibutyltin dilaurate and 0.3 g of hydroquinone are added. The mixture is heated rapidly to 120 degrees C. under a gentle stream of nitrogen and then the reaction temperature is gradually raised to 190 degrees C. over the course of 6 hours, during which the water of condensation produced is removed by distillation.

This gives a viscous, liquid binder resin BM3 having an acid number of 34 mg of KOH/g and the following temperature-dependent viscosities:

| Viscosity [mPas] | Temperature [degrees C.] |
|---|---|
| 9340 | 25 |
| 5300 | 50 |
| 870 | 75 |
| 320 | 100. |

Example 4

Preparation of the Binder BM4

661.1 g of dicyclopentadiene and 490.3 g of maleic anhydride are weighed into a flask incorporating heating and reflux condenser. The mixture is heated to 125 degrees C. under a gentle stream of nitrogen (to render it inert. Subsequently, 95.0 g of water are added from a dropping funnel over the course of one hour, after the mixture is left to after-react at 125 degrees C. for one hour more. This gives the monocarboxylic acid of formula (V). The contents of the flask are cooled to 70 degrees C. and then 5000.0 g of propyleneoxy polyether polyol having an OH equivalent of 1000 g/OH group, 7.0 g of dibutyltin dilaurate and 0.5 g of hydroquinone are added. The mixture is heated rapidly to 120 degrees C. under a gentle stream of nitrogen and then the reaction temperature is gradually raised to 190 degrees C. over the course of 6 hours, during which the water of condensation produced is removed by distillation.

This gives a viscous, liquid binder resin BM3 having an acid number of 17 mg of KOH/g and the following temperature-dependent viscosities:

| Viscosity [mPas] | Temperature [degrees C.] |
|---|---|
| 3490 | 25 |
| 1620 | 50 |
| 250 | 75. |

Example 5

Preparation of a Color Paste FP1 for Printing Inks for Beverage Cans 600 g of the binder BM3 according to Example 3 are homogenized thoroughly with 1800 g of titanium dioxide pigment (rutile type) under the action of a dissolver and the mixture is then ground on a laboratory three-roll mill to a particle fineness of less than 10 micrometers.

Example 6

Preparation of a Color Paste FP2 for Printing Inks for Beverage Cans 600 g of the binder BM3 according to Example 3 are homogenized thoroughly with 1200 g of phthalocyanine blue pigment under the action of a dissolver and the mixture is then ground on a laboratory three-roll mill to a particle fineness of less than 10 micrometers.

Example 7

Preparation of a Printing Ink DF1 for Beverage Cans 240 g of color paste FP1 according to Example 5 in a glass beaker are stirred, using a spatula, in succession with 100 [lacuna] binder BM3 according to Example 3 and 100 g of binder BM1 according to Example 1.

Then 10 g of tert-butyl perbenzoate are stirred in and the air incorporated by stirring is removed in a vacuum cabinet.

This gives a white printing ink DF1 having a viscosity of 9470 mPas at 25 degrees C.

Example 8

Preparation of a Printing Ink DF2 for Beverage Cans 240 g of color paste FP2 according to Example 6 in a glass beaker are stirred, using a spatula, in succession with 100 [lacuna] binder BM3 according to Example 3 and 100 g of binder BM2 according to Example 2.

Then 10 g of tert-butyl perbenzoate are stirred in and the air incorporated by stirring is removed in a vacuum cabinet.

This gives a white printing ink DF1 [sic] having a viscosity of 7840 mPas at 25 degrees C.

Example 9

Preparation of a Printing Ink DF3 for Beverage Cans 240 g of color paste FP1 according to Example 5 in a glass beaker are stirred, using a spatula, in succession with 100 [lacuna] binder BM3 according to Example 3 and 100 g of binder BM1 according to Example 1.

The air incorporated by stirring is removed in a vacuum cabinet.

This gives a white printing ink DF1 [sic] having a viscosity of 9470 mPas at 25 degrees C.

Example 10

Preparation of a Printing Ink DF4 for Beverage Cans 240 g of color paste FP2 according to Example 6 in a class beaker are stirred, using a spatula, in succession with 100 [lacuna] binder BM3 according to Example 3 and 100 g of binder BM2 according to Example 2.

The air incorporated by stirring is removed in a vacuum cabinet.

This gives a white printing ink DF1 [sic] having a viscosity of 7840 mPas at 25 degrees C.

Example 11

Testing of the Printing Inks DF1 to DF4

Samples of the ready-to-use printing inks DF1 to DF4 are stored at 70 degrees C. for 48 hours. After storage, no change can be found in the viscosity and in the curing characteristics.

Samples of the printing inks DF1 to DF4 are knife-coated in a layer thickness of 20 micrometers onto tin-plated sheet-metal panels (original metal sheets for beverage cans) and are dried in a convection oven at 210 degrees C. [sic] for 120 seconds. In each case, bright, flexurally stable and scratch-resistant colored coatings are obtained which show only minimal removal of color after rubbing 50 times with a wadding pad moistened with methyl ethyl ketone.

What is claimed is:

1. A solvent-free coating composition comprising a binder comprising a polyester comprising
   a) structural units selected from the group consisting of dihydrodicyclopentadiene units of the formula (I):

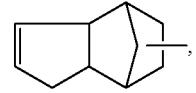

oligodihydrodicyclopentadiene units of the formula (II):

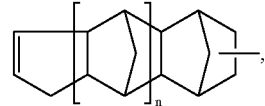

where n=1 to 10, and mixtures thereof; and
   (b) structural units selected from the group consisting of alkoxylated monoalcohols, alkoxylated polyols, monoalcohols comprising imide groups, polyalcohols comprising imide groups, monocarboxylic acids comprising imide groups, polycarboxylic acids comprising imide groups, and mixtures thereof.

2. The solvent-free coating composition of claim 1, wherein the binder comprises a polyester comprising structural units selected from the group consisting of esters of dihydrodicyclopentadienol in accordance with formula (III):

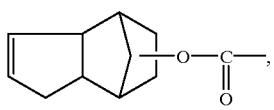

(III)

esters of oligodihydrodicyclopentadienol of the formula (IV):

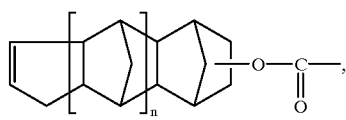

(IV)

where n=1 to 10, and mixtures thereof.

3. The solvent-free coating composition of claim 1, wherein the binder comprises monoesters selected from the group consisting of monoesters of dihydrodicyclopentadienol with an acid selected from the group consisting of maleic acid, fumaric acid and mixtures thereof, in accordance with formula (V):

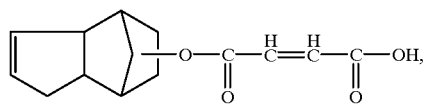

(V)

monoesters of an oligodihydrodicyclopentadienol with an acid selected from the group consisting of maleic acid, fumaric acid, and mixtures thereof, of the formula (VI):

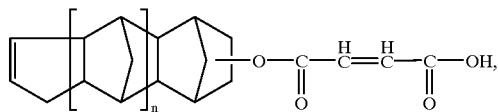

(VI)

where n=1 to 10, and mixtures thereof.

4. The solvent-free coating composition of claim 1, wherein the binder comprises a polyester wherein said polyester comprises structural units selected from the group consisting of alkoxylated monoalcohols, alkoxylatedpolyols, and mixtures thereof.

5. The solvent-free coating composition of claim 4 wherein the binder comprises a polyester comprising structural elements selected from the group consisting of monoalcohols containing polyester units, polyols containing polyester units, and mixtures thereof.

6. The solvent-free coating composition of claim 1, wherein the binder comprises ethylenically unsaturated structural units.

7. The solvent-free coating composition of claim 1, wherein the binder comprises structural units selected from the group consisting of mono-alcohols comprising imide groups, polyols comprising imide groups, and mixtures thereof.

8. The solvent-free coating composition of claim 1, wherein the binder comprises structural units selected from the group consisting of mono-carboxylic acids comprising imide groups, polycarboxylic acids comprising imide groups, and mixtures thereof.

9. The solvent-free coating composition of claim 1, comprising a binder free of reactive monomers.

10. The solvent-free coating composition of claim 1, wherein the binder comprises up to 100% by weight, based on the binder, of esterification products comprising structural units selected from the group consisting of those of the formulae (III), those of formulae IV, monoesters of the formulae V, monoesters of the formulae VI and mixtures thereof.

11. A process for the production of coatings using the solvent-free coating composition of claim 1, comprising thermally curing the coating composition at temperatures between 80 and 300 degrees C.

12. The process for the production of coatings using the coating composition of claim 1, comprising curing the coating compositions at temperatures above room temperature with the aid of free-radical initiators.

13. The process of claim 11 wherein the coating composition is of processing viscosity at room temperature.

14. A method of coating a container, comprising providing a solvent-free coating composition of claim 1 and applying the coating composition to a container.

15. The method of coating a container of claim 14, wherein the container is selected from the group consisting of cans, aluminum, steel plate, tin plate, and mixtures thereof.

16. The solvent-free coating composition of claim 1 comprising a polyester selected from the group consisting of saturated polyesters, unsaturated polyesters, and mixtures thereof.

17. The solvent-free coating composition of claim 1 wherein the alkoxylated mono-alcohols are selected from the group consisting of ethoxylated mono-alcohols, propoxylated mono-alcohols, and mixtures thereof.

18. The solvent-free coating composition of claim 1 wherein the alkoxylated polyols are selected from the group consisting of ethoxylated polyols, propoxylated polyols, and mixtures thereof.

19. The solvent-free coating composition of claim 13 wherein the processing viscosity is adjusted by heating to a temperature <130 degrees C.

* * * * *